US012807273B2

(12) United States Patent
Griewe et al.

(10) Patent No.: US 12,807,273 B2
(45) Date of Patent: Nov. 24, 2026

(54) SNOW BIKE

(71) Applicants: Donald L. Griewe, Farmington, UT (US); Gregory J. Kros, North Salt Lake, UT (US)

(72) Inventors: Donald L. Griewe, Farmington, UT (US); Gregory J. Kros, North Salt Lake, UT (US)

( * ) Notice: Subject to any disclaimer, the term of this patent is extended or adjusted under 35 U.S.C. 154(b) by 268 days.

(21) Appl. No.: 18/056,174

(22) Filed: Nov. 16, 2022

(65) Prior Publication Data

US 2024/0391559 A1 Nov. 28, 2024

Related U.S. Application Data

(60) Provisional application No. 63/280,021, filed on Nov. 16, 2021.

(51) Int. Cl.
*A61G 5/10* (2006.01)
*B62M 27/02* (2006.01)

(52) U.S. Cl.
CPC ....... *B62M 27/02* (2013.01); *B62M 2027/021* (2013.01); *B62M 2027/023* (2013.01); *B62M 2027/027* (2013.01)

(58) Field of Classification Search
CPC ............ B62M 27/02; B62M 2027/021; B62M 2027/023; B62M 2027/027; B60K 15/03; B62J 35/00
USPC .................................................. 180/190, 182
See application file for complete search history.

(56) References Cited

U.S. PATENT DOCUMENTS 4,204,581 A * 5/1980 Husted .................... B62B 13/14 280/11.115
5,607,026 A * 3/1997 Rioux .................... B62M 27/02 180/376
5,924,514 A * 7/1999 Bullerdick ............. B60K 15/06 180/314
6,279,923 B1 * 8/2001 Cardillo, Jr. ........... B62K 13/00 280/13
8,490,731 B2 * 7/2013 Eaton .................... B60R 25/302 180/190
10,293,883 B1 * 5/2019 Bedard .................. B62M 27/02
2012/0222908 A1 * 9/2012 Mangum ................ B62D 55/04 180/9.26
2018/0154985 A1 * 6/2018 Thompson ............. B62M 27/02
2019/0118904 A1 * 4/2019 LeBlanc ................ B62M 27/02

OTHER PUBLICATIONS

Snowmobile Definition & Meaning—Merriam-Webster. Retrieved from URL https://www.merriam-webster.com/dictionary/snowmobile on Aug. 1, 2025 (Year: 2025).*

* cited by examiner

*Primary Examiner* — Jason S Morrow
*Assistant Examiner* — Nabin Kumar Sharma
(74) *Attorney, Agent, or Firm* — Kunzler Needham Hilton

(57) ABSTRACT

One embodiment of the improved snow bike described herein includes a frame. A track may be mounted at least partially rearward of the frame and a power source may be mounted above at least a substantial portion of the track. A centrifugal clutch may be mounted at least partially to the side of the power source and may extend laterally outward from the power source.

20 Claims, 8 Drawing Sheets

SNOW BIKE

BACKGROUND

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a snow bike 10 representative of snow bikes of the prior art. The snow bike 10 is provided with a frame 12 and a track assembly 14 attached rearward of the frame 12 and containing a track 16. A fork 18 is attached to the front of the frame 12, a ski 20 is attached to the bottom of the fork 18, a seat 24 is attached at the top of the frame 12, and an engine 26 is attached within the frame 12 and toward the front bottom of the frame 12 as is customary with modern motorcycles.

The depicted snow bike 10 utilizes a frame 12 taken from a motorcycle. The track assembly 14 is generally a kit provided by snow bike manufacturers and is mounted to the rear of the frame 12 in lieu of a swing arm and a rear tire (not shown.) The ski 20 is attached to the fork 18 in lieu of a front tire (not shown). Most snow bikes of the prior art are made using a standard motorcycle that is usually a high powered dirt bike, removing the wheels and swingarm and attaching the track assembly 14 and the ski 20. The engine 26 is typically the stock engine from the motorcycle the snow bike 10 is made from.

The engine 26 drives a sprocket and chain as in a typical dirt bike. The chain is connected with a jack shaft, which typically contains a braking mechanism. Another chain extends from the jack shaft to a drive shaft and turns the drive shaft. The drive shaft has teeth that engage and turn the track. The snow bikes 10 of the prior art typically use a transmission 28 that is provided with the original motorcycle and is a standard transmission using a plurality of gears.

One problem with using the stock engine is that the engines from light weight motorcycles such as dirt bikes are limited in horse power and often have third of the power that a snowmobile might have. Turning a track through the snow is demanding on horse power, and many feel that current snow bikes lack speed and power compared to modern snowmobiles. Modifications can be made to the engines 26, but current engine modifications are limited in the horsepower that is added and are generally considered to be of limited reliability.

SUMMARY

One embodiment of the improved snow bike described herein includes a frame. A track may be mounted at least partially rearward of the frame and a power source may be mounted above at least a substantial portion of the track. A centrifugal clutch may be mounted at least partially to the side of the power source and may extend laterally outward from the power source.

A clutch guard may protect the centrifugal clutch and may have a hardened outer wall at least partially surrounding a periphery of the centrifugal clutch. The clutch guard may have an open side directed toward the frame in order to provide simultaneous protection to a rider and cooling of the centrifugal clutch.

A stock fuel tank may be mounted forward of the seat, and a second fuel tank may be mounted below the stock fuel tank in the frame in a recess originally adapted to a power source. In certain embodiments, the stock fuel tank and the lower mounted fuel tank are in fluid communication with each other to provide continuous fuel to the power source. A jack shaft may be in rotational connection to the power source for turning a track and may be provided with a centrally located sprocket for receiving a chain extending to a drive shaft that drives the track. A brake component may be disposed at one end of the jack shaft, and a secondary drive clutch of a centrifugal clutch system may be disposed at a second end of the jack shaft.

The power source may be a snowmobile engine or an electric motor mounted above the track with an engine mounting plate, and the track may be carried by a track assembly. The engine mounting plate may connect the track assembly with stock mounting surfaces of the snowmobile engine without requiring modification of the mounting surfaces, including stock apertures on the engine for receiving mounting bolts.

A cooling system for cooling the power source may be provided and may include a radiator and a heat exchanger in fluid communication with the radiator. A water jacket on the power source may be in fluid communication with the radiator such that fluid is pumped from the heat exchanger to the radiator and then to the water jacket in order to cool the power source. The snowmobile engine may be in gaseous communication with an exhaust pipe that is mounted forward of the snowmobile engine and rearward of the fuel tank. In this embodiment, the carburetor or fuel injectors are mounted rearward of the engine.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT

Figure 1:
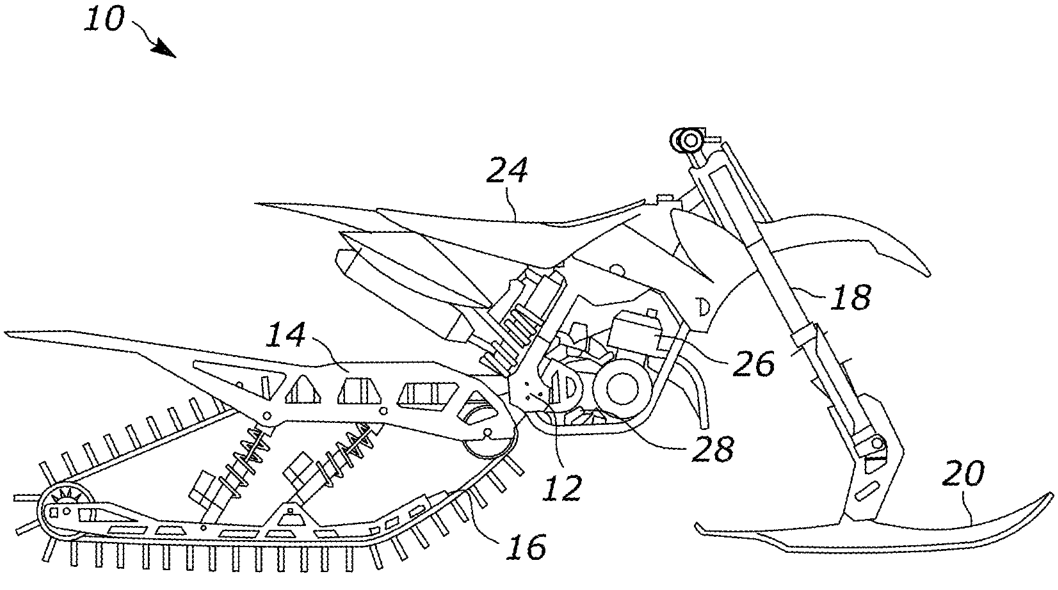
FIG. 1 (Prior Art)
FIG. 1 is a right side view illustrating one embodiment of a snowbike of the prior art.
Figure 2:
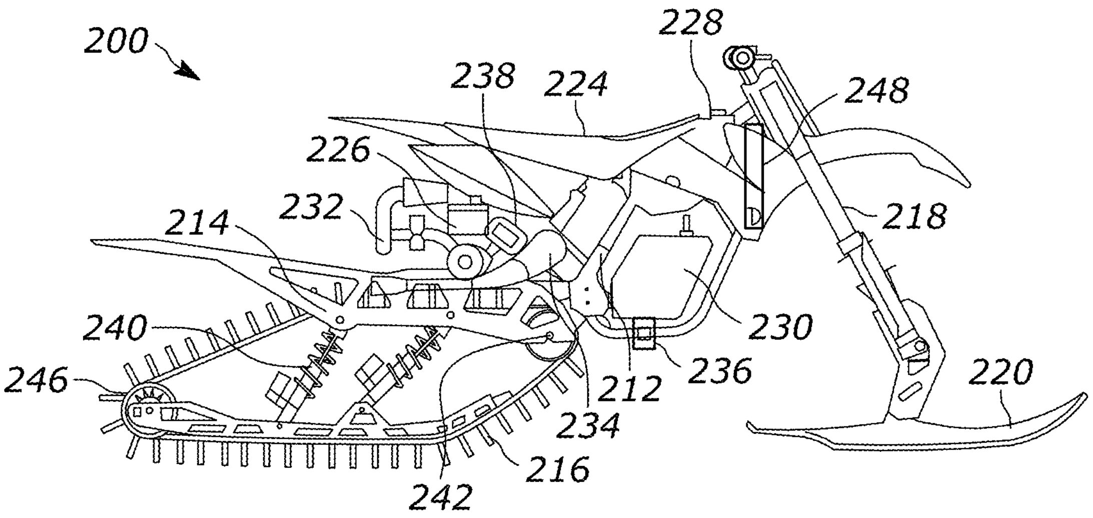
FIG. 2 is a right side view illustrating one embodiment of a snowbike of the present invention.

In order to overcome some or all of the limitations of the prior art, embodiments of the snow bike 200 are shown in FIG. 2. Depicted therein is a snow bike 200 having a frame 212. The frame 212 may be any frame capable of carrying a seat 224 and other components of the snow bike 200. In the depicted embodiment, the frame 212 is taken from an existing motorcycle. A radiator 248 is mounted to the front of the frame 212. A track assembly 214 is mounted to the rear of the frame 212 in lieu of a swing arm and a rear tire (not shown.) A ski 220 is attached to a fork 218 in lieu of a front tire (not shown). While the snow bike 200 may all be made in a common production process, in the depicted embodiment, the snow bike 200 is made using a standard dirt bike motorcycle, removing the wheels and swingarm, and attaching the track assembly 214 and the ski 220.

A fuel tank 228 is shown located in a standard position for a dirt bike and may be mounted to the frame 212. In the depicted embodiment, a second tank 230 is also shown located below the fuel tank 228 within a location of the frame 212 that in prior art snow bikes normally contains an engine. The snow bike 200 may be provided with one or both of the fuel tanks 228, 230.

An engine 226 is mounted substantially outside of the frame 212 and to the rear of the frame. Of course, portions of the engine 226 may remain within the frame 226. The engine 226 is shown mounted to the top of the track assembly 214. The engine 226 is in the depicted embodiment a snowmobile engine with a centrifugal clutch 310 (shown in FIG. 3). The engine 226 is one type of power source that may be used with embodiments herein. The engine 226 may be, for example, a single or multiple cylinder two or four stroke engine. In the depicted embodiment, the engine 226 is a Yamaha 700 SX snowmobile engine with a centrifugal clutch 310.

The power source may also be an electric motor (not shown) and may utilize batteries that may be stored within the frame 212 in the location where the fuel tank 228 is shown.

The engine 226 is shown mounted centrally above the track assembly 214 and is shown with the intake 232 of the engine to the rear of the engine 226 and the exhaust 234 toward the front of the engine 226. Of course, the engine 226 could be reversed in direction and could also be mounted sidewise with the intake 232 and exhaust 234 each located to one side of the snow bike 200.

Also shown in FIG. 2 are a set of footpegs 236 located to the bottom of the frame. The footpegs 236 in the depicted embodiment are located below the seat and take the weight of the rider when the rider's feet are placed upon the footpegs 236. A rider normally occupies a riding area by sitting on the seat 224 with the rider's legs extending downward to the footpegs 236. The rider's legs typically remain in the riding area between the seat 224 and the foot pegs 236. The engine 226 is, in the depicted embodiment, located substantially behind the area between the seat 224 and footpegs 236 where the riders legs will be located. In this manner, the engine 226 does not interfere with the riding area.

The engine 226 may be started manually or with a battery. In the depicted embodiment, a pull rope with a handle 238 is used to start the engine 226. The pull rope and handle 238 are shown to the right side of the engine 226, but could be located in other locations on the engine 226.

Also shown in FIG. 2 are the suspension 240, a front drive sprocket 244, and a rear drive coaster 246. In the depicted embodiment, the track assembly 214 is provided by a snow bike kit manufacturer. The track assembly 214 in the embodiment shown is a Timbersled Arro manufactured by Timbersled Products, Inc. of Sandpoint Idaho. The track assembly 214 is attached fixedly to the swingarm and shock mount (not shown) in a manner that is well known in the art. The track assembly 214 contains its own suspension 240 and does not utilize the suspension that comes stock on a motorcycle, though in some embodiments, one or more shocks are mounted between the swingarm assembly 214 and the frame 212 in a manner well known in the art. The ski 220 is also in this embodiment manufactured by Timbersled Products, Inc.

Figure 3:
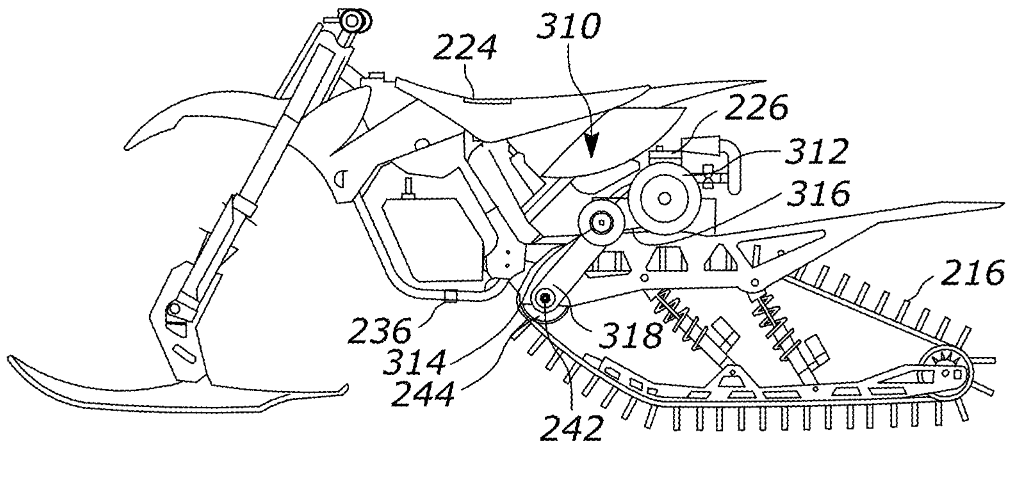
FIG. 3 is a left side view further illustrating embodiments of the snowbike of the present invention.

Referring now to FIG. 3, shown therein is the centrifugal clutch 310 that is mounted to the left side of the engine 226. The centrifugal clutch 310 is shown with a drive (or primary) clutch 312 and a driven (or secondary) clutch 314. The drive clutch 312 is powered by the engine 226 and turns a belt 316 that turns the driven clutch 314. The centrifugal clutch 310 protrudes outward from the engine 226 and is in one embodiment located entirely in an area that is behind the footpegs 236 and while partially under the seat 224, generally to the rear of the seat 224. Thus, while the centrifugal clutch 310 protrudes outward from the snow bike 200, it does not substantially protrude into the riding area that is in use occupied by the leg of a rider.

The driven clutch 314 is connected with and turns a chain 316 (of FIGS. 4 and 5) and is shown located under a chain case 318. The chain 316 drives the drive wheels 242 which engage with and turn the track 216.

Figure 4:
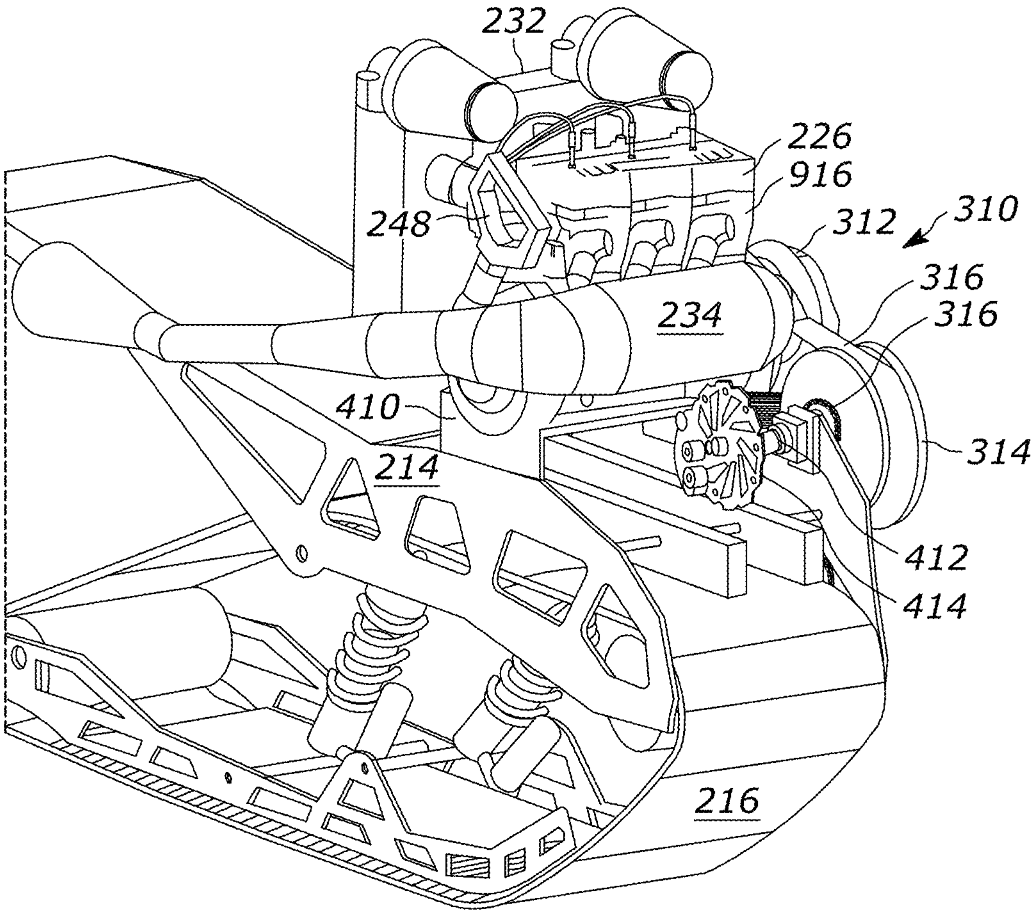
FIG. 4 is a perspective view showing an embodiment of a rear portion of the snowbike of the present invention.

FIG. 4 is a partially exploded view showing the track assembly 214 with the engine 226 mounted at the top thereof. The track assembly 214 is shown disconnected from the frame 12 of the snow bike 200 in order to more clearly show the components of the engine 226 and the centrifugal clutch 310. The engine 226 is shown with the intake 232 to the rear and the exhaust 234 to the front. The pull rope and handle 238 are shown to the right side of the engine 226.

A motor mount plate 410 is shown disposed between the track assembly 214 and the engine 226. The motor mount plate 410 is in one embodiment provided with holes, brackets, or other mechanisms to attach both to the track assembly 214 and the engine 226. In one embodiment, the motor mount plate 410 is configured with mounting mechanisms 610 (shown in FIG. 6) that bolt to the stock engine mounting points 612 of the engine 226. Thus, a stock engine may be mounted directly to the snow bike 200 without requiring modifications to the engine 226 or the engine mounting points 612.

Also shown in FIG. 4 is a jack shaft 412, that typically contains a braking mechanism 414. Another chain extends from the jack shaft 412 and extends to and turns a drive shaft 448 (of FIG. 5). The drive shaft 448 has a sprocket 244 with extending protrusions or "teeth" that engage and turn the track 216.

Figure 5:
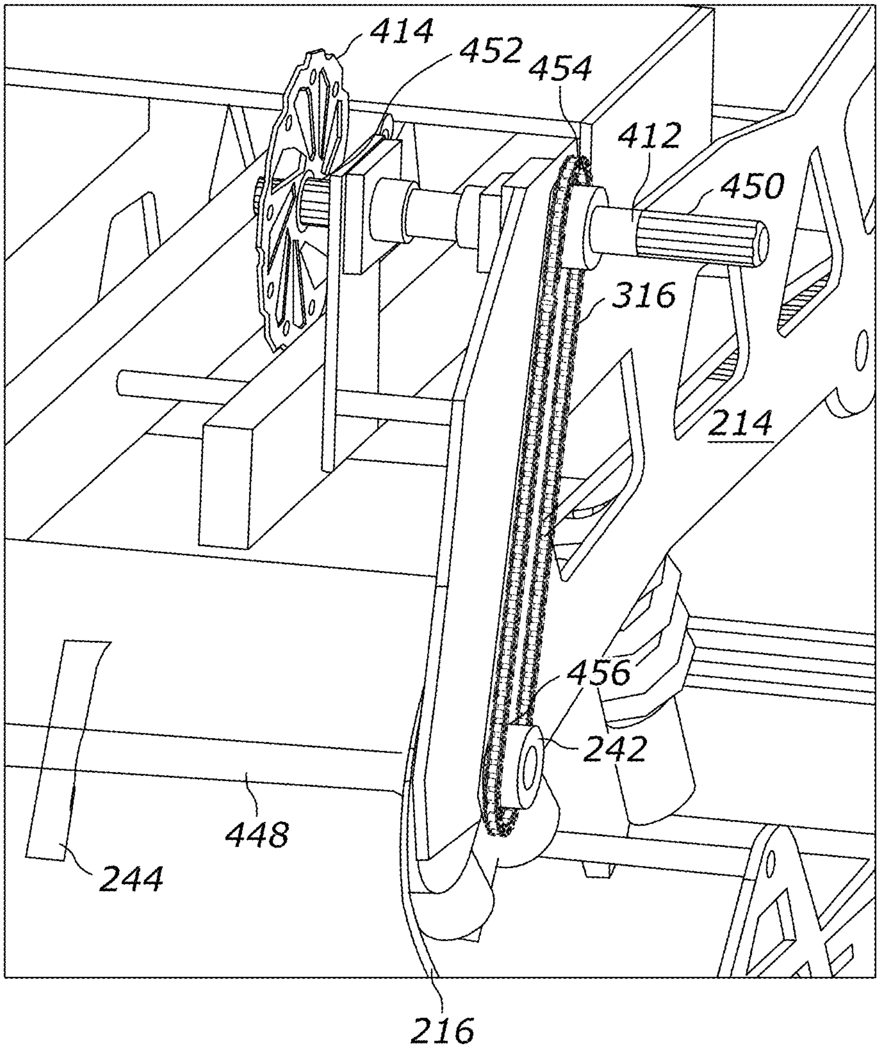
FIG. 5 is a perspective view showing an embodiment of a drive system of the snowbike of the present invention.

FIG. 5 shows this arrangement in greater detail. The jack shaft 412 is mounted to the track assembly 214 and has an interior end with splines 452 that receive a braking component shown as a disk 414 of the braking system. In a central portion of the jack shaft 412 is shown a sprocket 454 that drives the chain 316. To the exterior of the jack shaft 412 and shown on the left side of the track assembly 214 are splines 450 for receiving the driven clutch 314 (shown in FIG. 4). The chain 316 drives a sprocket 456 of a drive shaft 448 which turns the drive sprocket 244 which turns the track 216.

Figure 6:
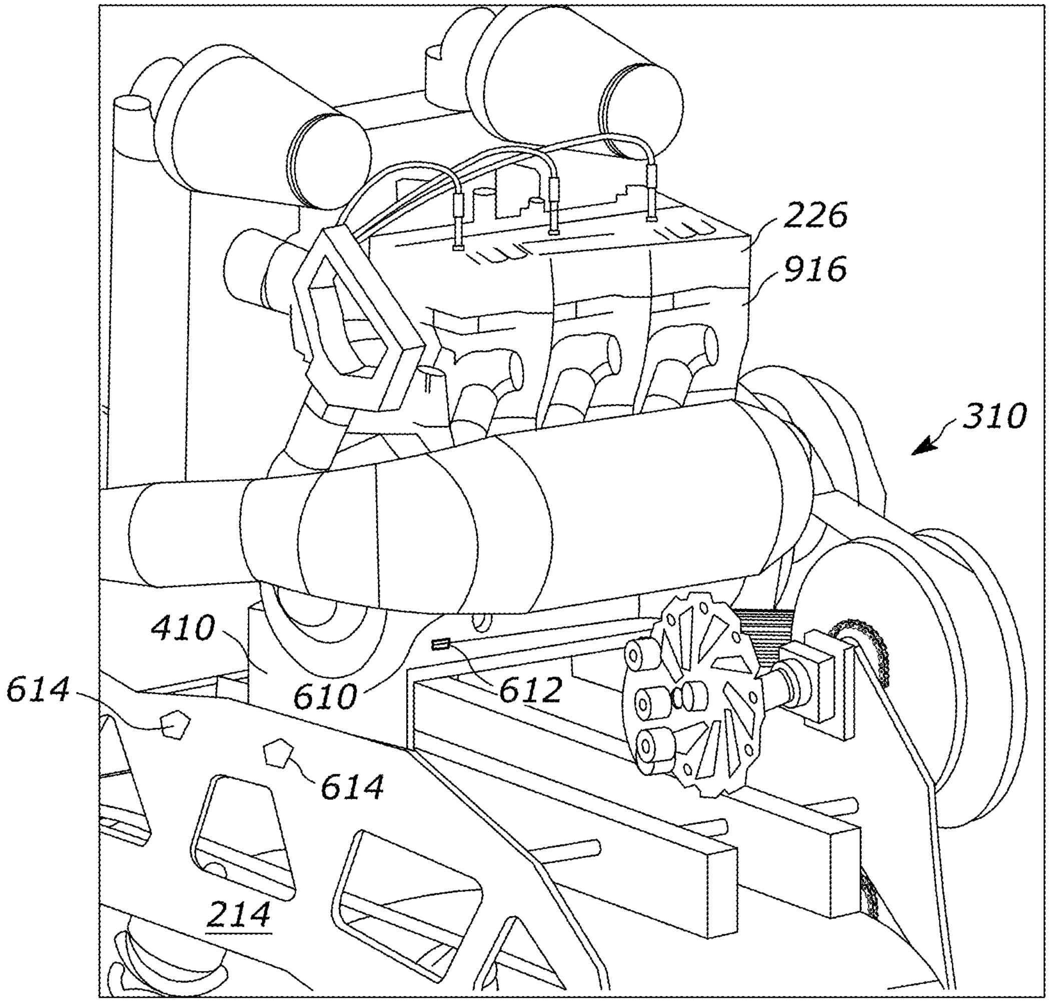
FIG. 6 is a perspective view showing an embodiment of the engine, drive system, exhaust pipe, and track of the snowbike of the present invention.

FIG. 6 is a zoomed in view of FIG. 4 and shows the engine mounting points 612 connected with the mounting mechanisms 610 of the motor mount plate 410. Also shown are bolts 614 passing through the track assembly 214 and the motor mount plate 410, securing the motor mount plate 410 to the track assembly 214. Of course, other mechanisms could be used to mount the power source to the track assembly, and the power source need not necessarily be mounted to the track assembly 214, and could instead be mounted entirely or partially to the frame 212.

Figure 7:
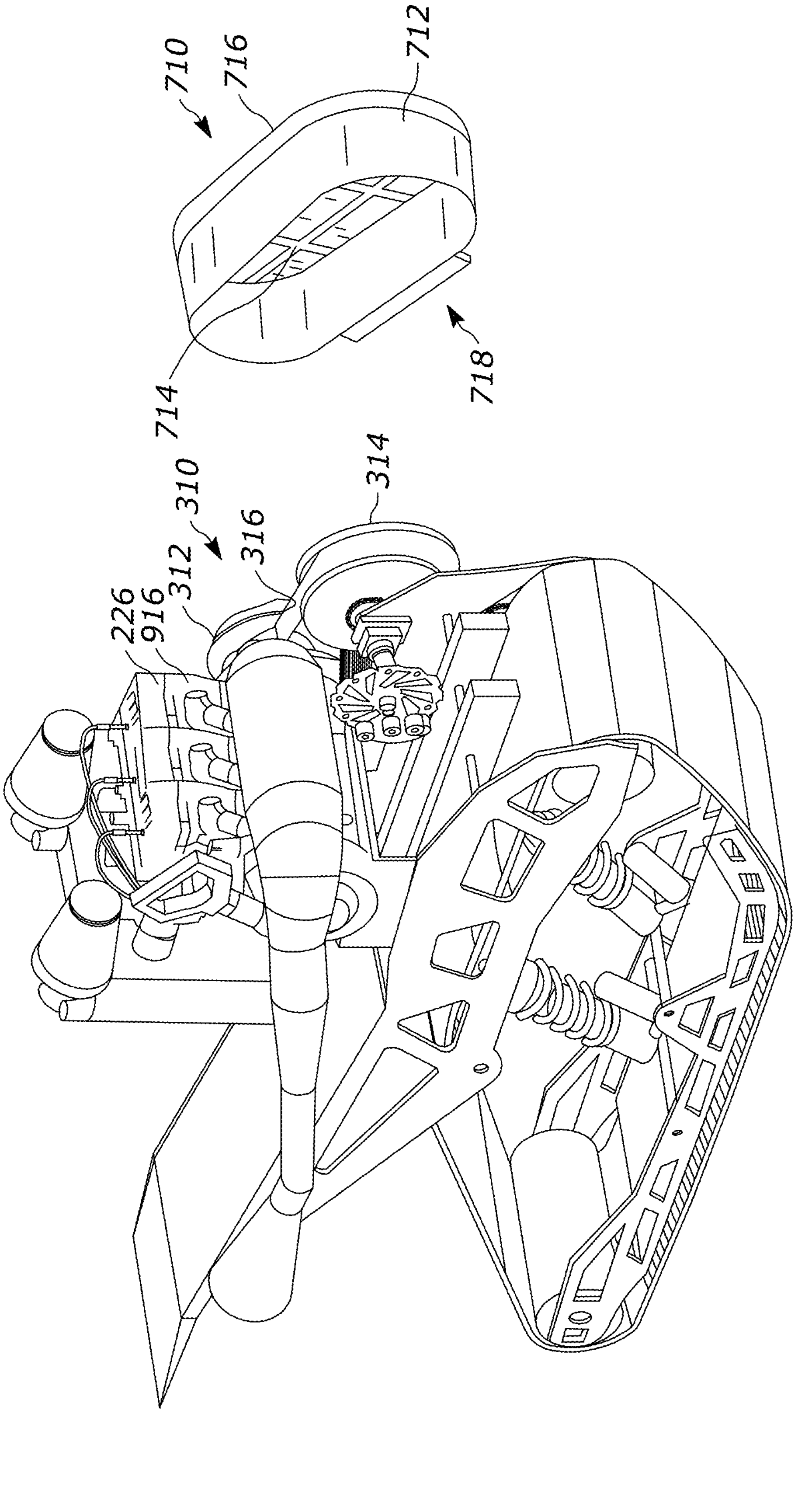
FIG. 7 is a partially exploded perspective view of the rear portion of the snowbike of FIG. 4.
Figure 8:
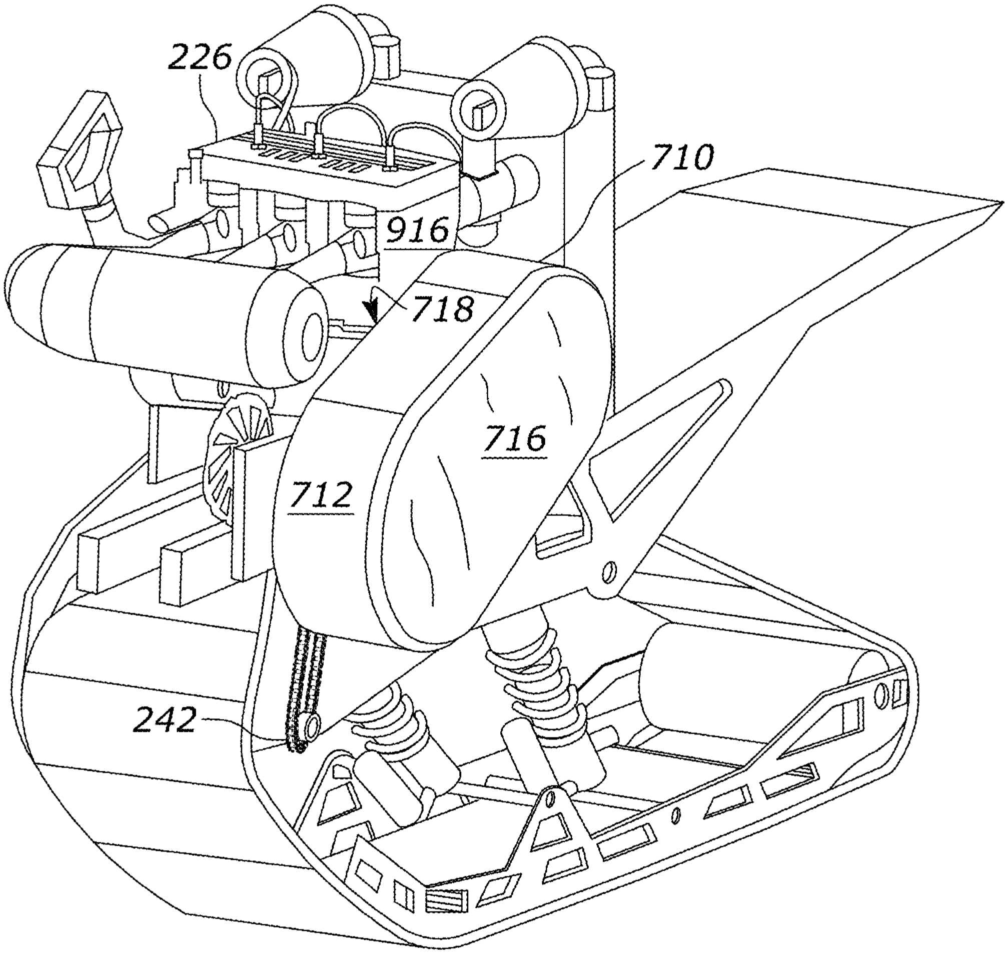
FIG. 8 is a right side perspective view of the rear portion of the snowbike of FIG. 7.

FIG. 7 is the partially exploded view of FIG. 4 also showing a clutch cover 710. FIG. 8 shows the clutch cover 710 from the opposite side. In the depicted embodiment, the clutch cover 710 partially covers the clutch assembly 310 and protects the rider's leg from any debris that may projected from the clutch, such as, for example, in instances where the belt 316 wears and loses integrity.

The clutch cover 710 is shown provided with a hardened wall 712 circumnavigating both the drive clutch 312 and the driven clutch 314. The hardened wall 712 may be made of any protective material, but in one embodiment is made of steel or aluminum. Carbon fiber is a further suitable material, given by way of example. A framework 714 may be provided in the external side of the clutch cover 710 and in the depicted embodiment supports a sheet 716 of breathable material that allows air to pass but prevents the passage of snow. The interior side 718 of the clutch cover 710 is left open in the depicted embodiment in order to allow greater passage of air in order to keep the centrifugal clutch 310 cool. In this manner, the centrifugal clutch 310 may be located at an exterior of the snow bike 200 and to the rear of the rider's leg, while simultaneously protecting the rider's leg and allowing cooling air to circulate around the centrifugal clutch 310.

Figure 9:
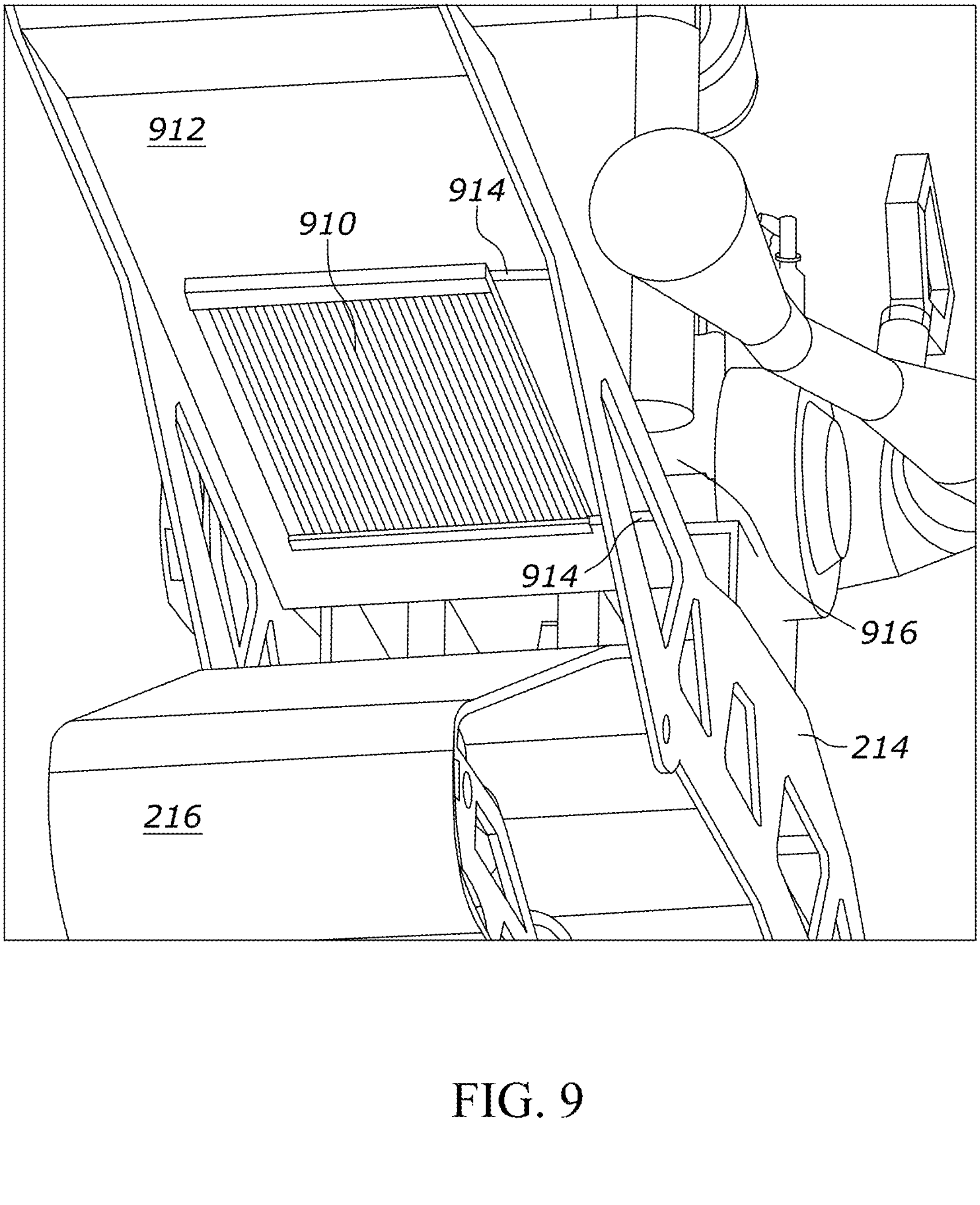
FIG. 9 is a perspective view showing a heat exchanger attached to a track assembly of the present invention.

FIG. 9 shows a heat exchanger 910 mounted to an underside of a tunnel 912 of the track assembly 214. The heat exchanger 910 is fluidly coupled with the radiator 248 and the water jacket 916 (also shown in FIGS. 4, 6, 7, and 8). The heat exchanger 910 is preferably located in a location such as the tunnel 912 in order for snow kicked up by the track 216 to be thrown onto the heat exchanger 910 thereby cooling the coolant being pumped through the heat exchanger 910. In one embodiment, the heat exchanger 910 precools coolant that passes from the water jacket 916 of the engine 226 prior to passing through the radiator 248. The order of cooling components could be reversed with the coolant flowing from the water jacket 916 to the radiator 248 and then to the heat exchanger 910 prior to returning to the water jacket 916.

The snow bike 200 in certain embodiments overcomes a problem of the prior art of snow bikes needing more power by accommodating a higher horse power snowmobile engine 226. The engine 226 may be driven by a centrifugal clutch 310, allowing the rider to not have to shift and providing a smoother transfer of power between the power source and the track 216. Locating the engine 226 (or other power source) behind the frame lightens the front end of the snow bike 200 and allows the track assembly in certain embodiments to carry the engine 226, thus allowing a larger engine 226 to be used without interfering with a riding area of the rider.

The problem of the location of the centrifugal clutch 316 is solved by locating the engine behind the rider with the primary and secondary clutches 312, 314 protruding outward. The clutch cover 710 simultaneously protects the rider's leg while allowing air to cool the centrifugal clutch 316.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
- a frame;
- a track mounted at least partially rearward of the frame;
- a power source mounted at least partially rearward outside the frame and centrally vertical above at least a substantial portion of the track;
- a centrifugal clutch mounted at least partially to a side of the power source and extending laterally outward from the power source;
- a front drive sprocket coupled to the power source and a forward portion of the track, wherein:
  - the front drive sprocket is configured to drive the track responsive to being driven by the power source, and
  - the front drive sprocket is positioned closer to a front of the apparatus than the power source; and
- a rear drive coaster coupled to the track and positioned at a rearward portion of the track.

2. The apparatus of claim 1, further comprising a clutch guard having a hardened outer wall at least partially surrounding a periphery of the centrifugal clutch, the clutch guard having an open side directed toward the frame in order to provide simultaneous protection to a rider and cooling of the centrifugal clutch.

3. The apparatus of claim 1, wherein the power source is a snowmobile engine and further comprising an engine mounting plate and wherein the track is carried by a track assembly, the engine mounting plate connecting the track assembly with stock mounting surfaces of the snowmobile engine without requiring modification of the mounting surfaces.

4. The apparatus of claim 1, further comprising a fuel tank mounted in the frame in a recess originally adapted to a power source.

5. The apparatus of claim 1, further comprising a jack shaft, the jack shaft comprising:
- a. a first centrally located sprocket for receiving a chain and coupled to a drive shaft that drives the front drive sprocket responsive to the chain being driven by the jack shaft via a second centrally located sprocket;
b. a brake component disposed at a first end of the jack shaft; and
c. a secondary drive clutch of a centrifugal clutch system disposed at a second end of the jack shaft.

6. The apparatus of claim 1, further comprising a cooling system for cooling the power source, the cooling system comprising:
a. a radiator;
b. a heat exchanger in fluid communication with the radiator;
c. a water jacket on the power source in fluid communication with the radiator; and
d. wherein fluid is pumped from the heat exchanger to the radiator and then to the water jacket in order to cool the power source.

7. The apparatus of claim 1 wherein the power source is a snowmobile engine.

8. The apparatus of claim 1 wherein the power source is an electric motor.

9. The apparatus of claim 1, wherein the power source is a snowmobile engine taken from a snowmobile, the frame is taken from a dirt bike, and the track and front ski are taken from a commercially available kit.

10. The apparatus of claim 4, further comprising a stock fuel tank mounted to the tank, and wherein the stock fuel tank and the fuel tank are in fluid communication to provide continuous fuel to the power source.

11. An apparatus, comprising:
a frame;
a track mounted at least partially rearward of the frame;
an engine mounting plate mounted above at least a substantial portion of the track;
an engine mounted to the engine mounting plate using stock mounting surfaces of the engine, including multiple apertures for receiving stock bolts;
a front drive sprocket coupled to the engine and a forward portion of the track, wherein:
the front drive sprocket is configured to drive the track responsive to being driven by the engine, and
the front drive sprocket is positioned closer to a front of the apparatus than the engine; and
a rear drive coaster coupled to the track and positioned at a rearward portion of the track,
wherein the engine is located at least partially rearward outside the frame and centrally vertical above the at least the substantial portion of the track responsive to being mounted to the engine mounting plate.

12. The apparatus of claim 11, further comprising a clutch guard having a hardened outer wall at least partially surrounding a periphery of the centrifugal clutch, the clutch guard having an open side directed toward the frame in order to provide simultaneous protection to a rider and cooling of the centrifugal clutch.

13. The apparatus of claim 11, wherein the power source is a snowmobile engine and further comprising an engine mounting plate and wherein the track is carried by a track assembly, the engine mounting plate connecting the track assembly with stock mounting surfaces of the snowmobile engine without requiring modification of the mounting surfaces.

14. The apparatus of claim 11, further comprising a fuel tank mounted in the frame in a recess originally adapted to a power source.

15. The apparatus of claim 11, further comprising a jack shaft, the jack shaft comprising:
a. a first centrally located sprocket for receiving a chain and coupled to a drive shaft that drives the front drive sprocket responsive to the chain being driven by the jack shaft via a second centrally located sprocket;
b. a brake component disposed at a first end of the jack shaft; and
c. a secondary drive clutch of a centrifugal clutch system disposed at a second end of the jack shaft.

16. The apparatus of claim 11, further comprising a cooling system for cooling the power source, the cooling system comprising:
a. a radiator;
b. a heat exchanger in fluid communication with the radiator;
c. a water jacket on the power source in fluid communication with the radiator; and
d. wherein fluid is pumped from the heat exchanger to the radiator and then to the water jacket in order to cool the power source.

17. The apparatus of claim 11 wherein the power source is a snowmobile engine.

18. The apparatus of claim 14, further comprising a stock fuel tank mounted to the tank, and wherein the stock fuel tank and the fuel tank are in fluid communication to provide continuous fuel to the power source.

19. An apparatus, comprising:
a frame;
a track mounted at least partially rearward of the frame;
a power source mounted at least partially rearward outside the frame and centrally vertical above at least a substantial portion of the track;
a centrifugal clutch mounted at least partially to the side of the power source and extending laterally outward from the engine;
a clutch guard having a hardened outer wall at least partially surrounding a periphery of the centrifugal clutch, the clutch guard having an open side directed toward the frame in order to provide simultaneous protection to a rider and cooling of the centrifugal clutch;
a stock fuel tank mounted forward of the seat;
a fuel tank mounted in the frame in a recess originally adapted to a power source, the stock fuel tank and the fuel tank in fluid communication with each other;
a front drive sprocket coupled to the power source and a forward portion of the track, wherein:
the front drive sprocket is configured to drive the track responsive to being driven by the power source, and
the front drive sprocket is positioned closer to a front of the apparatus than the power source; and
a rear drive coaster coupled to the track and positioned at a rearward portion of the track;
a jack shaft, the jack shaft comprising:
a first centrally located sprocket for receiving a chain and coupled to a drive shaft that drives the front drive sprocket responsive to the chain being driven by the jack shaft via a second centrally located sprocket;
a brake component disposed at one end of the jack shaft; and
a secondary drive clutch of a centrifugal clutch system disposed at a second end of the jack shaft;
a snowmobile engine;
an engine mounting plate, wherein the track is carried by a track assembly, the engine mounting plate connecting the track assembly with stock mounting surfaces of the snowmobile engine without requiring modification of the mounting surfaces; and a cooling system for cooling the power source, the cooling system comprising:
a radiator;
a heat exchanger in fluid communication with the radiator; and
a water jacket on the power source in fluid communication with the radiator; and
wherein fluid is pumped from the heat exchanger to the radiator and then to the water jacket in order to cool the power source.

20. The apparatus of claim 19 wherein the snowmobile engine is in gaseous communication with an exhaust pipe, and wherein the exhaust pipe is mounted forward of the snowmobile engine and rearward of the fuel tank.

* * * * *